United States Patent [19]

Hehl

[11] Patent Number: 4,565,116

[45] Date of Patent: Jan. 21, 1986

[54] HYDRAULIC SPEED CONTROLS FOR DIE CLOSING UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 541,797

[22] Filed: Oct. 14, 1983

[30] Foreign Application Priority Data

Oct. 14, 1982 [DE] Fed. Rep. of Germany ....... 3238111

[51] Int. Cl.⁴ ............................................. F15B 13/06
[52] U.S. Cl. .......................................... 91/519; 91/453; 91/459; 425/451.2; 425/590; 425/135; 92/11
[58] Field of Search .................... 425/451.2, 590, 135; 91/519, 453, 367, 459, 275, 361; 92/9, 12, 11; 60/591

[56] References Cited

U.S. PATENT DOCUMENTS

| 3,237,641 | 3/1966 | Audemar | 91/453 |
| 3,698,826 | 10/1972 | Henderson | 92/11 |
| 3,894,477 | 7/1975 | Tomikawa | 92/12 |
| 4,326,750 | 4/1982 | Rosenbaum | 91/453 |
| 4,380,427 | 4/1983 | Hehl | 425/451.2 |
| 4,443,179 | 4/1984 | Wohlrab | 91/519 |

OTHER PUBLICATIONS

Mannesman/Rexroth–Information, 3/1982, ISSN, pp. 6–7.

*Primary Examiner*—Robert E. Garrett
*Assistant Examiner*—Richard S. Meyer

[57] ABSTRACT

A hydraulic actuator assembly for a push-type die closing unit of an injection molding machine which has a central, internally bypassable power piston, lateral cylinders for rapid opening travel and a rearward stationary plunger for rapid closing travel, the lateral travel cylinders and the pressure spaces of the power cylinder creating a differential effect under which a small external flow volume of pressurized fluid is required from the pump to produce rapid opening and closing travel while a much larger internal flow volume passes through a flow connection between the cylinders. A program-controlled proportional-response throttle valve in this flow connection gives an accurate and steady control over the travel speeds, especially during deceleration. The throttle valve also makes it possible to obtain a forcible initial die opening movement.

12 Claims, 1 Drawing Figure

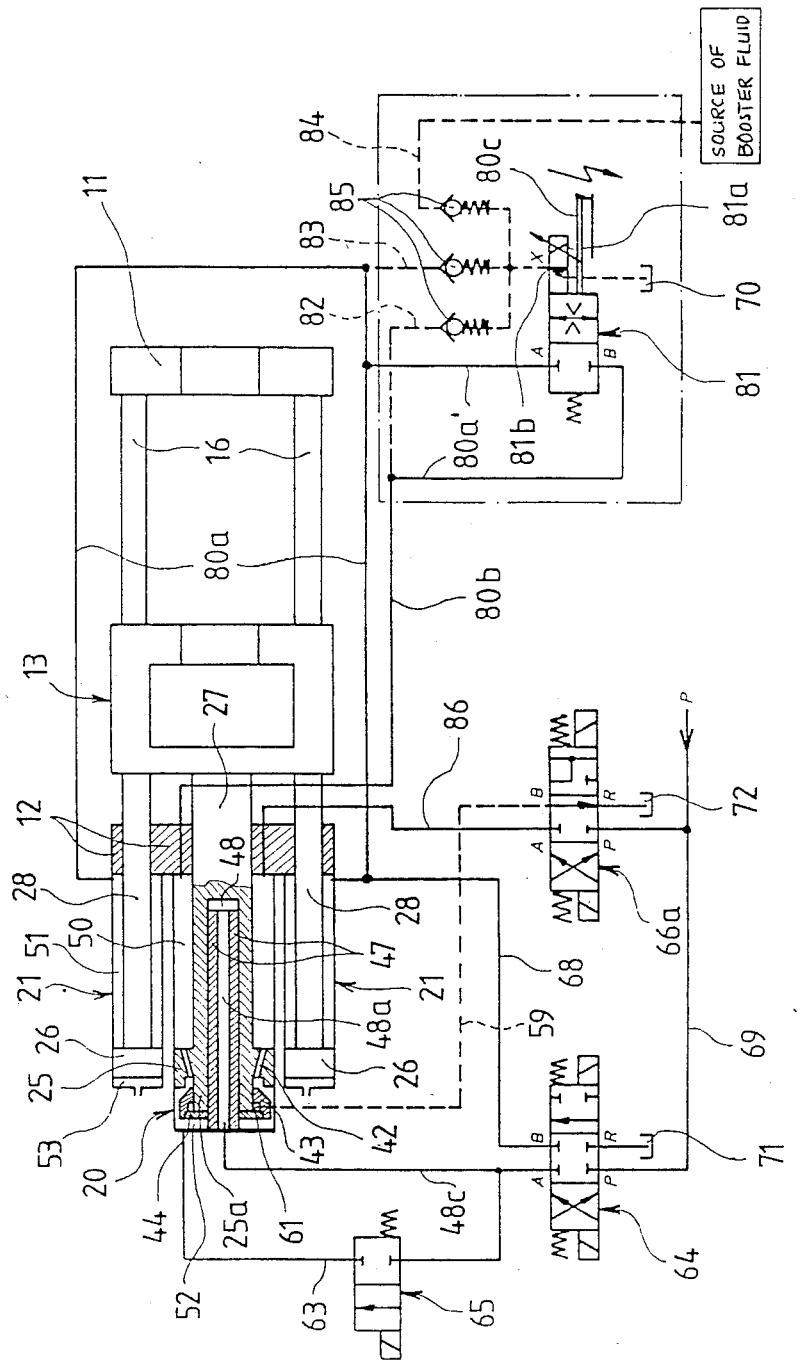

HYDRAULIC SPEED CONTROLS FOR DIE CLOSING UNIT OF INJECTION MOLDING MACHINE

BACKGROUND OF THE INVENTION

1. Field of the Invention

The present invention relates to injection molding machines and, more particularly, to a speed control arrangement for the hydraulic actuator assembly of a push-type die closing unit of an injection molding machine which has auxiliary cylinders for rapid-travel opening and closing movements.

2. Description of the Prior Art

In my German Pat. No. 30 44 137 and my corresponding U.S. Pat. No. 4,380,427 is disclosed a hydraulic actuator assembly for a push-type die closing unit for injection molding machines which produces rapid die opening and closing movements with a small volume of pressurized fluid and creates an elevated die closing pressure against the closed injection molding die.

This actuator assembly consists essentially of a central power cylinder with a selectively bypassable power piston, two opening travel cylinders arranged alongside the power cylinder, on diametrically opposite sides of the latter, and a stationary closing travel plunger arranged inside the power cylinder piston rod.

The power piston divides the bore of the power cylinder into a low-pressure space on its forward side and a larger high-pressure space on its rearward side. The low-pressure space of the power cylinder communicates with the pressure spaces of the two opening travel cylinders, forward of their pistons, and the total effective area of the three connected pressure spaces is larger, by a relatively small amount, than the area of the high-pressure space of the power cylinder. Because this difference determines the fluid volume which is taken in during the opening movement, a rapid opening movement is obtained with a small amount of pressurized fluid.

The stationary plunger is arranged in a central bore in the rear portion of the power piston rod. With its relatively small pressure space, it produces a similarly rapid closing movement with a small amount of pressurized fluid. An elevated die closing pressure is obtained by closing the power piston bypass channels and by pressurizing both the high-pressure space to the rear of the power piston and the plunger pressure space.

This arrangement, while making it possible to obtain rapid opening and closing movements of the die closing unit with a small amount of pressurized fluid, may develop certain control problems, especially when a heavy die closing unit is operated at high speeds. The moving mass, consisting of the movable die carrier frame with its movable die half and the attached power piston and travel pistons with their piston rods, receiving its force input from a comparatively small pressure space during the opening and closing movements, may develop undesirable movement fluctuations under deceleration at the end of the movement strokes.

The compactness of this hydraulic actuator assembly makes it possible to tilt the die closing unit into a vertical orientation, for injection into the partition plane of the injection molding die. However, additional control problems can arise in this orientation, due to the fact that the weight of the moving mass adds to, or subtracts from, the forces which are required for acceleration and deceleration of this mass.

SUMMARY OF THE INVENTION

Underlying the present invention is the primary objective of improving the hydraulic actuator assembly described above in such a way that the earlier-mentioned control problems encountered at high-speed opening and closing travel of the moving parts of the die closing unit are eliminated, for a smoother machine operation at high operating speeds.

The present invention proposes to attain this objective by suggesting an improved hydraulic actuator assembly of the type described above which has its various pressure spaces so arranged that the internal fluid flow between the low-pressure space of the power cylinder and the pressure spaces of the opening travel cylinder, or cylinders, which takes place during opening and closing travel is a multiple of the volume of pressurized fluid which is supplied to the actuator by the pump, in order to create the opening and closing movements, and that in the flow connection for this much larger internal flow is arranged a continuously adjustable throttle valve.

By arranging the hydraulic speed controls on a magnified flow of fluid, the invention makes it possible to obtain a much more sensitive response to speed changes and to achieve a much smoother progressive reduction of this flow in the deceleration phase of the opening and closing movements. This means that the moving parts of the die closing unit can be decelerated faster and from higher travel speeds without vibrations and/or rebounding.

The additional arrangement of a valve-controlled discharge line in said flow connection, at a point between the throttle valve and the power cylinder, combined with the capability of blocking the flow connection on the travel cylinder side by completely closing the throttle valve, makes it possible to produce a more forceful initial opening movement of the injection molding die. Such a forcible initial die opening movement is called for in situations, where the molded part and the die halves generate high resistance to separation.

The arrangement of the throttle valve in the high-volume flow connection also makes it possible to accurately control the opening and closing movements of a die closing unit in vertical orientation, which generates elevated deceleration forces at the end of its downward opening movements.

With the capability of more accurately controlling the deceleration at the end of the rapid travel opening and closing movements comes an important safety enhancement, inasmuch as the invention also brings about a safer emergency stopping action and a reduction in the stopping distance for the movable die carrier member at full closing speed, when the safety gate is opened, for example. The internal flow blockage which results, when the throttle valve in the high-volume flow connection is closed, safely arrests the moving parts, even in the event that the safety valve in the pressure supply line, or any of the operating valves of the hydraulic actuator, should fail.

In a preferred embodiment of the invention, the continuously adjustable throttle valve in the flow connection between the low-pressure space of the power cylinder and the pressure spaces of the two opening travel cylinders is an electromagnetically driven proportional-response throttle valve, and the pre-programmed adjustment settings of the valve are verified by means of a feedback circuit receiving input signals from a displacement transducer arranged at the electromagnetic unit of the valve.

Such a valve, accepting flow in one direction only, is known from the sales brochure Mannesmann/Rexroth Information 3/1982, ISSN 0722-5636, pages 6 and 7. For the purpose of the present invention, the valve has been modified to accept bi-directional flow.

The hydraulic booster unit of this throttle valve is connected to a separate source of booster fluid for startup and, during operation, receives booster fluid from the flow connection, either downstream or upstream of the throttle valve. Back pressure valves separate the three connections.

The valve which controls the discharge line from the low-pressure space during forcible die opening is preferably combined with the valve which controls the pressure space of the power piston bypass valve.

In the preferred embodiment, the various cylinder pressure spaces are so dimensioned that the volumes of pressurized fluid required for rapid opening and closing travel are substantially identical, and the flow volume passing through the throttle valve during opening travel is approximately three times larger.

BRIEF DESCRIPTION OF THE DRAWINGS

Further special features and advantages of the invention will become apparent from the description following below, when taken together with the accompanying drawings which illustrate, by way of example, a preferred embodiment of the invention, represented as follows:

The sole FIGURE shows, in a schematic representation, a die closing unit with a hydraulic actuator assembly and its major hydraulic control components, as an embodiment of the present invention.

DESCRIPTION OF THE PREFERRED EMBODIMENT

The present invention represents an improvement in a hydraulic actuator assembly of the type which is disclosed and claimed in my U.S. Pat. No. 4,380,427, the disclosure of which should be considered incorporated herein. The basic arrangement of the die closing unit and of the various cylinder units of the hydraulic actuator being unchanged from said patent, they are shown only schematically in the drawing of this application:

For tie rods 16, their extremities anchored in a stationary die carrier plate 11 and in a stationary cylinder head plate 12, at the four corners of a square, support a movable die carrier frame 13 for horizontal die opening and closing movements. To the movable die carrier frame 13 are attached a piston rod 27 of a power cylinder 20 and the piston rods of two opening travel cylinders 21.

The centrally arranged power cylinder 20 and the diametrically oppositely arranged opening travel cylinders 21 are axially delimited on their forward extremities by the cylinder head plate 12 and on their rearward extremities by a common cylinder cover, the three cylinder units thus forming a compact hydraulic assembly. The two cylinders 21 are single-acting cylinders, the pressureless space 53 between the cover and the travel pistons 26 being open to the atmosphere.

The power piston 25 which is seated on the piston rod 27 of the power cylinder 20 divides the interior space of the latter into a forward low-pressure space 50 between the piston and the cylinder head plate 12 and a rearward high-pressure space 52 between the piston and the cylinder cover. A number of bypass channels 42 extend axially through the power piston 25, this power piston bypass being closable by means of a annular valve plunger 43 which is guided for axial movements by a collar extension 25a and a piston rod collar 44 on the rearward extremity of the piston rod 27. A valve pressure space 61, formed between the piston rod collar 44 and the annular valve plunger 43, when pressurized, moves the latter against a valve seat on the power piston 25 to close the power piston bypass.

The cylinder cover carries a stationary plunger 47 which reaches into a blind cylinder bore in the center of the piston rod 27 to form a plunger pressure space 48. An axial plunger feed channel 48a in the form of a central bore in the stationary plunger 47 links the plunger pressure space 48 to a plunger supply line 48c. The cylinder unit formed by the stationary plunger 47 and the cylinder bore serves as a closing travel cylinder, a comparatively small amount of pressurized fluid pumped into the plunger pressure space 48 producing a rapid forward travel of the piston rod 27 and its attached movable die carrier frame 13.

The travel piston 26 of the two opening travel cylinders 21 form two annular pressure spaces 51 of substantially the same longitudinal extent as the low-pressure space 50 of the power cylinder 20. The two pressure spaces 51 are permanently connected through a connecting line 80a and are also connected to the low-pressure space 50, via the lines 80a', and 80b. These lines can be very short, being preferably arranged inside the cylinder head plate 12. In the line 80a' is arranged a valve 81 which is described in more detail further below.

The power piston bypass in the power cylinder 20 remains open during all axial movements of the piston rod 27. It is closed only when the movable die carrier frame 13 is in the closed position and an elevated die closing pressure is to be generated. For this purpose, the valve pressure space 61 is pressurized, via its valve supply line 59, to close the annular valve plunger 43, whereupon the high-pressure space 52 is supplied with pressurized fluid, via the closing pressure supply line 63 and the open closing pressure valve 65. The annular valve plunger 43 is so arranged that, when the pressure in its pressure space 61 is relaxed, the presence of any pressure in either the low-pressure space 50 or the high-pressure space 52 will move the annular valve plunger 43 away from the bypass channels 42.

As the die closing unit executes an opening or closing movement, the power piston 25 and the two travel pistons 26 move in unison inside their cylinders 20 and 21, respectively. The power piston 25 thereby moves "through" the fluid which is contained in the power cylinder 20, as one of its two pressure spaces is shortened and the other one is lengthened. But, because the effective area of the high-pressure space 52 is larger than the effective area of the low-pressure space 50, the combined volume of the two pressure spaces decreases in the course of a die opening movement and increases in the course of a die closing movement. A corresponding amount of fluid must exit from, or enter into, the low-pressure space 50 during opening and closing travel.

At the same time, the volume of fluid contained in the connected pressure spaces 51 of the two opening travel cylinder 21 increases or decreases during opening and closing travel, respectively. By making the total effective area of the two opening travel cylinders 21 fractionally larger than the differential effective area of the power cylinder 20, i.e. larger than the difference between the areas of the high-pressure space 52 and low-pressure space 50, the opening travel cylinders 21 will not only take in the exiting fluid from, and supply the entering fluid to, the low-pressure space 50 during die opening and closing movements, respectively, but a corresponding fractional amount of fluid must at the same time enter into, or exit from, the opening travel cylinders 21.

Accordingly, when such a fractional volume of pressurized fluid is supplied to the opening travel cylinders 21, while they communicate with the low-pressure space 50 of the power cylinder 20, the actuator produces a rapid opening travel. The plunger pressure space 48 is preferably so dimensioned that it requires the same volume of fluid to produce the closing travel. In each case, the volume of fluid which is transferred internally between the pressure spaces 51 and the low-pressure space 50 is a multiple of the volume of fluid supplied to the actuator by the hydraulic pump. As far as these hydraulic relationships are concerned, the device of the invention corresponds substantially to the device described in my U.S. Pat. No. 4,380,427.

The present invention takes advantage of the magnified flow volume in the flow connection between the travel pressure spaces 51 and the low-pressure space 50, by arranging in the flow connection, i.e. between the line 80a which permanently connects the two opening travel cylinders 21 and a line 80b which leads to the low-pressure space 50, a control line 80a' with a throttle valve 81 in the form of a proportional-response throttle valve which is continuously adjustable in accordance with a pre-established operating program.

The throttle valve 81 has an electromagnetic unit 81a with a proportional-response electromagnet and a hydraulic booster unit 81b receiving its drive fluid alternatively from one of three different sources: a first booster fluid line 82 linking it to the low-pressure space 50, via the line 80b, a second booster fluid line 83 linking it to the opening travel pressure spaces 51, via the connecting line 80a, and a third booster fluid line 84 leading to a separate source of booster fluid. By arranging back pressure valves 85 in the three booster fluid lines upstream of their junction, fluid from the line with the highest pressure is supplied to the booster unit 81b. The spent booster fluid returns to the reservoir at 70.

The proportional-response throttle valve 81 also includes a displacement transducer 80c which is part of a feedback circuit for the continuous verification of the valve adjustment position against the nominal setting called for by the machine operating program.

When arranged in a hydraulic circuit as shown in the drawing, the throttle valve 81, together with a main control valve 64, a closing pressure valve 65 and a bypass control valve 66a, makes it possible to obtain four distinct operating modes within an operating cycle of the hydraulic actuator: a rapid opening travel mode, followed by a rapid closing travel mode, an elevated die closing pressure mode in the closed position of the die and, if necessary, a forcible initial die opening mode.

Starting from a closed position of the die closing unit, a complete operating cycle of the hydraulic actuator involves the following control actions: The valve positions shown in the drawing are positions for the die closing unit at rest. In order to initiate the opening travel, the main control valve 64 is moved to the right, so the pressure spaces 51 are connected to the pump P, via the opening travel supply line 68 and the main supply line 69, while the plunger pressure space 48 is connected to the reservoir at 71, via the plunger supply line 48c. The closing pressure valve 65 remains closed, and the bypass control valve 66a remains in its rest position in which the valve pressure space 61 is connected to the reservoir at 72, via the valve supply line 59, for an open power piston bypass. A discharge line 86, which leads from the low pressure space 50 to the bypass control valve 66a, remains blocked. The throttle valve 81 is opened by moving it to the left.

In this valve configuration, the pressure spaces 51 of the two opening travel cylinders 21 receive a small volume of pressurized fluid from the opening travel supply line 68 and a magnified volume of transfer fluid from the low-pressure space 50, via the flow connection which consists of the connecting line 80a, the line 80a' with the throttle valve 81, and the line 80b. The rearwardly moving piston rod 27 causes a small volume of fluid to exit through the plunger supply line 48c. As the actuator approaches its open position, it is decelerated at a predetermined rate by the program-controlled progressively closing throttle valve 81 in the high-volume flow connection.

The closing travel is obtained by switching the main control valve 64 to its extreme left position, in which the plunger pressure space 48 is connected to the pump P, via the main supply line 69 and the plunger supply line 48c. The bypass control valve 66a is likewise switched to the extreme left position, in which the pressure space 61 of the bypass valve remains open to the reservoir at 72 and the low-pressure space 50 of the power cylinder 20 is also open to the reservoir at 72, via its discharge line 86. The closing pressure valve 65 remains closed, and the throttle valve 81 remains open.

The actuator now executes a rapid closing travel, as a small volume of pressurized fluid enters the plunger pressure space 48 and a similarly small volume of fluid exits from the low-pressure space 50, via the discharge line 86. At the same time, a magnified volume of fluid is pushed into the low-pressure space 50 from the two pressure spaces 51, via the flow connection of lines 80a, 80a' and 80b, and a fractional volume is pushed back out of the low-pressure space 50, via the discharge line 86. Again, the throttle valve 81 in the line 80a' controls the speed and, especially, the deceleration at the end of the closing travel, by determining the fluid flow in the high-volume flow connection.

For the generation of an elevated closing pressure in the closed position of the die closing unit, the closing pressure valve 65 is opened to the right, while the main control valve 64 remains in its left position, thereby maintaining the connection between the plunger pressure space 48 and the main supply line 69, while also connecting the high-pressure space 52 to the main supply line 69 via the closing pressure supply line 63. At the same time, the bypass control valve 66a is switched to its extreme right position, in which it connects the valve pressure space 61 to the main supply line 69, via the valve supply line 59, while opening the discharge line 86 to the reservoir at 72.

In this configuration, the combined areas of the high-pressure space 52 and the plunger pressure space 48 are effective to generate a high die closing pressure. The throttle valve is ineffective, as no piston travel takes place in this operating mode.

The operating mode in which a forcible initial die opening movement is obtained requires closing of the closing pressure valve 65, movement of the main control valve 64 to its extreme right (same position as for opening travel), movement of the bypass control valve 66a to its extreme left (same position as for closing travel), and closing of the throttle valve 81.

In this configuration, the low-pressure space 50 of the power cylinder 20 is separated from the pressure spaces 51 by the closed throttle valve 81 and, instead, is connected to the reservoir at 72, via the discharge line 86 and the bypass control valve 66a. The two opening travel cylinders 21 thus respond to a supply of pressurized fluid from the opening travel supply line 68 with the entire effective area of their pressure spaces 51 to produce a correspondingly augmented opening force. By switching the bypass control valve 66a and the throttle valve 81 to their "opening travel" positions, the actuator is switched from the slower forcible opening mode to the faster opening travel mode.

The cross-sectional dimensions and the resultant effective areas of the plunger pressure space 48, the opening travel pressure spaces 51, and the power cylinder pressure spaces 50 and 52 are preferably so coordinated that, in the opening travel mode, the volume of pressurized fluid which is fed into the opening travel cylinders 21 and the volume which is simultaneously discharged through the plunger supply line 48c amount to approximately one-twentieth of the total volume of fluid contained in these pressure spaces in the closed position of the movable die carrier frame 13, and that, in the forcible opening mode, the volume of pressurized fluid which is fed into the pressure spaces 51 and the volume which is simultaneously discharged through the axial plunger feed channel 48a and the discharge line 86 amounts to approximately one-fifth of that total volume.

The volumes of fluid which are supplied and discharged in the closing travel mode are preferably the same as in the opening travel mode. Under these circumstances, the fluid volume which is supplied and discharged through the opening travel supply line 68 and the plunger supply line 48c in the two travel modes amounts to approximately one-third of the volume of fluid which simultaneously flows into the low-pressure space 50 through the flow connection and the throttle valve 81 in the opening travel mode, and it amounts to approximately one-fourth of that volume in the closing travel mode. The difference is due to the fact that the discharged volume passes through the throttled flow connection in the closing travel mode, but not in the opening travel mode.

The suggested size relationships of the various pressure spaces also signifies that the opening force obtainable in the forcible opening mode is about four times as large as the opening force obtainable in the opening travel mode. Due to the presence of an inevitable minimal flow resistance in the throttled flow connection, the actual force ratio may be closer to five.

When the die closing unit is operated in a vertical orientation, the weight of the moving parts—consisting of the movable die carrier frame 13 with the movable die half, the two piston rods 28 with their travel pistons 26, and the piston rod 27 with its power piston 25 and annular valve plunger 43—is added to, or subtracted from, the forces which are required for acceleration and deceleration of the same moving parts in horizontal die opening and closing movements. The proportional-response throttle valve in the high-volume flow connection, by being operable in accordance with any predetermined program, lends itself readily for operation under a program which compensates for the effect of gravity on the moving parts, at least to the extent that increased or decreased deceleration forces are generated at the end of the opening and closing travels, respectively.

It should be understood, of course, that the foregoing disclosure describes only a preferred embodiment of the invention and that it is intended to cover all changes and modifications of this example of the invention which fall within the scope of the appended claims.

I claim the following:

1. A hydraulic actuator assembly adapted for use in a die closing unit of an injection molding machine as a rapid-travel drive for die opening and closing movements and as a source of elevated die closing pressure, which die closing unit includes a stationary cylinder head plate and a movable die carrier member guided for die opening and closing movements along the center axis of the die closing unit, whereby, in the die closing travel, said member moves away from the cylinder head plate in an axially forward direction; the hydraulic actuator assembly comprising in combination:

a power cylinder extending rearwardly from the cylinder head plate, in alignment with the center axis of the die closing unit, the bore of the power cylinder being axially delimited by the cylinder head plate and a rear cylinder cover and enclosing a power piston seated on a piston rod which extends sealingly through the cylinder head plate and is connected to the movable die carrier member, the power piston dividing the interior space of the power cylinder into a high-pressure space on the rear side of the piston and a cross-sectionally smaller low-pressure space on the forward side of the piston;

a closable power piston bypass in the form of at least one bypass channel in the power piston connecting said high-pressure and low-pressure spaces, and hydraulically operated valve means for opening and closing the power piston bypass, so that, when the piston moves rearwardly in a die opening movement and the bypass is open, a volume of fluid corresponding to the difference between the effective areas of two pressure spaces is displaced out of the power cylinder;

hydraulic cylinder means for imparting to the movable die carrier member a forwardly directed force producing a closing travel;

means for supplying pressurized fluid to the high-pressure space of the power piston, when the power piston bypass is closed, so as to create an elevated die closing pressure against the movable die carrier member in the closed position of the die closing unit;

at least one opening travel cylinder in parallel alignment with the power cylinder, the opening travel cylinder having a cylinder bore and a matching travel piston seated on a piston rod which is connected to the piston rod of the power cylinder to move in unison with the latter, the travel piston dividing the interior space of the opening travel cylinder into a pressureless space on the rear side of the piston and an opening travel pressure space on its forward side, and the total effective area of opening travel pressure space being larger than said difference between the effective areas of the power cylinder pressure spaces by a net opening travel area; and a flow connection between the low-pressure space of the power cylinder and the pressure space of the opening travel cylinder, or cylinders, respectively, so arranged that, when the pistons move rearwardly in a die opening movement, with the power piston bypass open, fluid corresponding to said difference in power cylinder pressure spaces passes from the latter into the opening travel pressure space, and an opening travel is obtained, when pressurized fluid corresponding to said net opening travel area is supplied to said connected pressure spaces and, conversely, a die closing movement causes a volume of fluid to pass from the opening travel pressure space into the low-pressure space of the power cylinder and a volume of fluid corresponding to said net opening travel area to exit from said connected pressure spaces into a fluid return line; and wherein the net opening travel area by which the effective area of the opening travel pressure space exceeds the difference between the effective areas of said power cylinder pressure spaces is a fraction of said difference, and the volume of pressurized fluid which is required to produce an opening travel of the movable die carrier member is, correspondingly, a fraction of the volume of fluid which simultaneously passes through said flow connection between the low-pressure space of the power cylinder and the opening travel pressure space; and said flow connection includes a continuously adjustable throttle valve adapted to control the speed of opening travel and closing travel by determining the flow rate at which it allows fluid to pass through said flow connection.

2. A hydraulic actuator assembly as defined in claim 1, wherein
the throttle valve in the flow connection is an electromagnetically driven proportional-response throttle valve adapted for bi-directional flow.

3. A hydraulic actuator assembly as defined in claim 2, wherein
the proportional-response throttle valve in the flow connection includes a feedback circuit with a displacement transducer supplying to the feedback circuit a control signal indicative of the valve adjustment position.

4. A hydraulic actuator assembly as defined in claim 2, wherein
the proportional-response throttle valve in the flow connection includes a hydraulic booster unit receiving booster fluid from a separate source of valve booster fluid, via a booster fluid line.

5. A hydraulic actuator assembly as defined in claim 4, wherein
the proportional-response throttle valve in the flow connection includes two additional booster fluid lines linking its booster unit to the low-pressure space of the power cylinder and to the pressure space of the opening travel cylinder, respectively, thereby providing two additional alternate sources of valve booster fluid; and
each of said three booster fluid lines includes a back pressure valve, and the three booster fluid lines are joined upstream of the back pressure valves, so that booster fluid is supplied to the booster unit of the throttle valve only from the source which has the highest fluid pressure.

6. A hydraulic actuator assembly as defined in claim 1, further comprising
closing valve means operable to close off the flow connection between the low-pressure space of the power cylinder and the pressure space of the opening travel cylinder, or cylinders, respectively; and
discharge valve means operable to open the low-pressure space of the power cylinder to a fluid return line, so that, when pressurized fluid is supplied to the opening travel pressure space with the flow connection closed and the low-pressure space open to a return line, the entire cross-sectional area of the opening travel pressure space is effective to produce a forcible die opening action in the form of a slower die opening movement with a correspondingly increased force, as compared to said die opening travel which is obtained, when the flow connection is open and the low-pressure space is closed to the return line.

7. A hydraulic actuator assembly as defined in claim 6, wherein
the closing valve means is operably associated with said continuously adjustable throttle valve; and
the discharge valve means is part of a multi-way valve which is adapted to also open the low-pressure space to a return line, for fluid discharge during a die closing movement.

8. A hydraulic actuator assembly as defined in claim 1, wherein
said hydraulic cylinder means which produces a closing travel includes
a stationary plunger extending axially forwardly from the rear cover of the power cylinder into a matching blind cylinder bore in the center of the power piston rod, so as to define a plunger pressure space between the plunger and the blind end of the cylinder bore which is smaller than the total pressure space of the opening travel cylinder, or cylinders, respectively; and
means for supplying pressurized fluid to the plunger pressure space to create a forwardly directed force against the power piston rod which produces a closing travel of the movable die carrier member.

9. A hydraulic actuator assembly as defined in claim 8, comprising
two opening travel cylinders arranged on diametrically opposite sides of the power cylinder, the pressure spaces of the two travel cylinders being identical in size and permanently connected with each other.

10. A hydraulic actuator assembly as defined in claim 9, wherein
the effective areas of the high-pressure and low-pressure spaces of the power cylinder which, by their difference, determine the volume of fluid which passes through said flow connection during opening travel, and the total effective area of the opening travel pressure space are so dimensioned that said volume is approximately three times as large as the volume of fluid which is required to produce an opening travel of the movable die carrier member; and
the effective area of the plunger pressure space is so dimensioned that the volume of fluid which is required to pro duce a closing travel is approximately equal to said volume of fluid which is required to produce an opening travel.

11. A hydraulic actuator assembly as defined in claim 9, wherein the throttle valve in said flow connection is closable;
the actuator further includes discharge valve means for opening the low-pressure side of the power cylinder to a fluid return line; and
the high-pressure and low-pressure spaces of the power cylinder, the two opening travel pressure spaces and the plunger pressure space are so dimensioned that, when pressurized fluid is supplied to the opening travel pressure space, with the throttle valve closed and said discharge valve means open, approximately one fifth of the total volume of fluid contained in said pressure spaces is discharged from the plunger pressure space and from the low-pressure space.

12. A hydraulic actuator assembly as defined in claim 11, wherein the high-pressure and low-pressure spaces of the power cylinder, the two opening travel pressure spaces and the plunger pressure space are so dimensioned that, when pressurized fluid is supplied to the opening travel pressure space, with the throttle valve open and said discharge valve means closed, approximately one twentieth of the total volume of fluid contained in said pressure spaces is discharged from the plunger pressure space.

* * * * *